Patented July 7, 1942

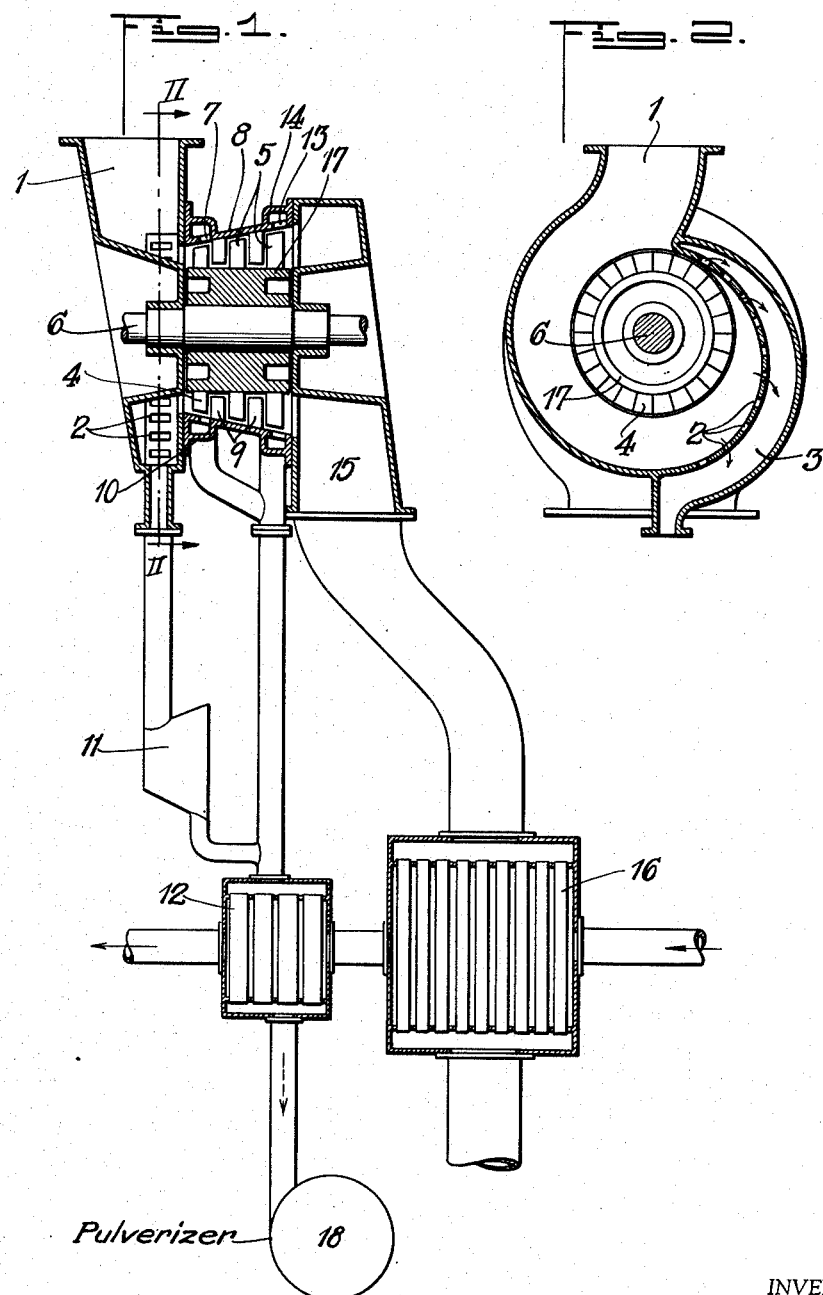

2,288,734

UNITED STATES PATENT OFFICE 2,288,734

GAS PURIFYING TURBINE PLANT

Walter Gustav Noack, Baden, Switzerland, assignor to Brown, Boveri & Cie, Baden, Switzerland, a corporation Application November 7, 1939, Serial No. 303,338
In Germany March 1, 1935

5 Claims. (Cl. 60—41)

The present invention relates to a dust separator more particularly to a dust separator for removing unburnt particles and fly ash from hot high pressure combustion gases as produced in high pressure furnaces and which gases are used for operating a gas turbine which receives said gases directly from said dust separator and which turbine may be arranged directly adjacent to and integral with said dust separator and form a unit therewith.

The present application is a continuation in part of my copending application Ser. No. 65,814, which matured into Patent No. 2,187,627, issued January 16, 1940.

Pulverized coal fired combustion chambers produce a great amount of fly ash and coal dust which pollutes the air in the neighborhood of such plants. The dust is also harmful to the interior of the machinery because of its clogging and erosion effect. In the case of high pressure combustion chambers which produce hot high pressure combustion gases for operating gas turbines which turbines may operate the compressors for supplying combustion air to said combustion chambers the dust wears out the turbine blading and is also harmful to other parts of the machinery on which the hot gases containing dust may have the effect of a sand blower. In such cases it is not sufficient to provide a centrifugal dust separator of conventional design at the gas outlet of the boiler or other plant operated by gases from the high pressure combustion chamber or to remove the bulk of the unburnt particles and slag by providing sharp diversions in the gas stream within and/or at the gas outlet of the plants. Experience has shown that the dust which passes through devices of the type set forth particularly through gas turbines at high velocity is ground to such a degree of fineness that, after leaving the pulverized fuel operated plant, it is often carried so far away by the normal air currents that it causes practically no air pollution. It is, however, necessary to protect the gas turbine from dust particles.

It is usually desirable to operate with high velocity of the gases produced in a high pressure furnace. High velocity of the gas stream is essential in a gas turbine.

It is an object of the present invention to utilize the high gas velocity which is needed in desirable in parts of the plant immediately ahead of the gas turbine with respect to the gas flow and in the gas turbine itself for separating dust from the gas stream.

It is a further object of the present invention to provide a dust separator of such configuration that the direction of the gas flow through and the velocity caused by said separator is such as to be immediately useful for the operation of the turbine so that the whole or at least a considerable part of the kinetic energy of the gas stream in the separator is directly used in the gas turbine for producing power.

The gas velocities employed in a plant according to the present invention are high and the dust separator is efficient though its dimensions are small. The separator itself is immediately adjacent to the gas turbine and is arranged within or forms the gas admission conduit to the turbine. The first row or rows of turbine guide blades and/or rotating buckets may be constructed to act as dust separator; a dust separator may be constructed also integral with lower pressure stages of the turbine. The essential feature of the present invention is that the once produced gas velocity is utilized for the dust separation process as well as for the operation of the gas turbine.

Further and other objects and advantages of the present invention will be apparent from the accompanying specification and claims and shown in the drawing which, by way of illustration, show what I now consider to be preferred embodiments of my invention.

In the drawing:

Figure 1 is a diagrammatic longitudinal sectional view of a separator and turbine unit and gas utilization plant according to the present invention.

Figure 2 is a diagrammatic cross sectional view of a dust separator and turbine unit according to the present invention and taken along line II—II in Figure 1.

Like parts are designated by like numerals in all figures of the drawing.

Referring more particularly to the drawing, 1 designates the gas inlet conduit to the gas turbine 6. The gases enter conduit 1 at high velocity and are then forced to assume a rotational motion because of the rotund interior configuration of channel 1. Heavy particles carried along with the gases are thrown towards the curved outer wall of conduit 1 and roll along said wall until they roll into the slots or openings 2 and therefrom into the chamber 3 which is arranged outside of and around a part of conduit 1. A small part of the hot high pressure gases also escapes through said openings and may be conducted with the dust particles into another turbine 11 which is made of particularly high temperature and erosion resisting material and which may be built to operate at relatively low speed to reduce erosion effect of the dust. The main part of the now substantially dust-free gases enters the first row of turbine blades 4 whereby the rotational kinetic energy of the gases part of which was used for separating the dust is now used for operating the turbine. Further turbine stages 5 may be provided on the turbine rotor 17 for transforming the energy of the gases into rotary power.

Further openings or slots 7 may be provided in the turbine casing 8 adjacent to the turbine blades 5 and in between said blades and the following stationary blades 9. The fine dust removed through openings 7 enters the annular chamber 10 and may be conducted therefrom together with the gases escaping through openings 7 into a heat exchanger 12 built of erosion resisting material and having wide gas passages to reduce clogging.

In a multistage turbine, the fine dust remaining in the gases moves outwards towards the interior wall of the turbine casing and it is of advantage to provide further dust removing openings 13 in said casing adjacent to the last stage or stages of the turbine. The dust and gas escaping through openings 13 moves through an annular channel 14 and may also be conducted into the heat exchanger 12.

The gases which are almost completely purified and have given up most of their energy in the dust separator-gas turbine unit according to the present invention are finally withdrawn from the unit through the outlet 15 and may be conducted therefrom into a heat exchanger 16 of normal design to transfer any heat left in the gases, for example, to a stream of combustion air. It is advisable to conduct gases containing dust which are discharged from the turbine 11 and/or the heat exchanger 12 again into a pulverizer 18 in which the slag particles and unburnt material are broken up and made suitable for combustion.

The present invention is also suitable for use in connection with oil or gas fired plants in which the produced combustion gases carry much impurities.

While I believe the above described embodiments of my invention to be preferred embodiments, I wish it to be understood that I do not desire to be limited to the exact details of design and construction shown and described, for obvious modifications will occur to a person skilled in the art.

I claim:

1. A dust separator and gas turbine unit adapted to purify and to be operated by hot gases containing solid particles, said unit having a gas inlet part comprising a spiral casing having gradually reduced cross sectional configuration and imparting a fast combined rotating, radial, and axial motion to the gases for the operation of the turbine as well as for throwing out of the gas stream solid particles by centrifugal force, particle removing means connected with said inlet part and removing the thrown out solid particles from said spiral casing, and a turbine rotor having blades mounted thereon and forming buckets rotating with said rotor, said gas inlet part being directly connected for gas flow with said buckets and said buckets directly receiving the gases at the high velocity imparted in said inlet part and converting the kinetic energy in the gas stream from said inlet part into useful work.

2. A dust separator and gas turbine unit adapted to purify and to be operated by hot gases containing solid particles, said unit having a turbine portion having an annularly shaped gas inlet conduit, a spiral-shaped gas inlet duct having a gradually reduced cross sectional configuration and a circumferential wall gradually approaching said gas inlet conduit and imparting a fast combined rotating, radial, and axial motion to the gases for the operation of the turbine as well as for throwing solid particles out of the gas stream and on to said circumferential wall, solid particles removing means connected with said circumferential wall for removing the solid particles from said duct, and a turbine rotor in said turbine portion having rotating buckets directly connected for gas flow with said gas inlet conduit.

3. A dust separator and gas turbine unit adapted to purify and to be operated by hot gases containing solid particles, said unit having a turbine portion comprising an annularly shaped gas inlet conduit, a spiral-shaped gas inlet duct having a gradually reduced gas flow area and a circumferential wall gradually converging towards said gas inlet conduit and imparting a fast combined rotating, radial, and axial motion to said gases for the operation of the turbine as well as for throwing solid particles out of the gas stream and on to said circumferential wall, said circumferential wall having openings providing an outlet for the solid particles thrown on to said wall, a duct connected with said openings for removing said solid particles, and a turbine rotor in said turbine portion having rotating buckets directly connected for gas flow with said gas inlet conduit.

4. A thermodynamically and constructionally unified dust separator and gas turbine plant comprising a dust separator and gas turbine unit adapted to purify and to be operated by hot gases containing dust, said unit including a turbine portion comprising an annularly shaped gas inlet conduit, a gas turbine receiving operating gas directly from said inlet conduit, gas inlet channel means having a wall of substantially spiral configuration and forming a gradually reduced gas flow area and gradually converging to said gas inlet conduit and imparting a high speed combined circular, radial, and axial motion to said gases for throwing the dust to said wall by centrifugal action and directing the gases at high velocity into said inlet conduit and into said gas turbine, openings in said wall for removing the dust thrown to said wall together with a part of the gases, a duct of gradually increasing flow capacity disposed outside of and directly adjacent to said wall and conducting dust and gases removed through said openings at substantially undiminished velocity, and a second gas turbine directly connected with said duct and receiving gas and dust therefrom at substantially undiminished velocity and directly converting said velocity into useful power.

5. A thermodynamically and constructionally unified dust separator and gas turbine plant comprising a gas turbine, a substantially circular gas inlet conduit having gradually reduced gas flow area and annular gas outlet means concentrically connected to one side thereof, said conduit imparting a combined high speed rotational, radial, and axial motion to the gases for throwing solid particles contained in the gas to the interior wall of said conduit, dust removal means connected with said conduit, and a gas turbine directly connected for gas flow with said outlet means and directly receiving a gas stream from said means at substantially unchanged direction and speed and converting the kinetic energy of the gas stream into mechanical power.

WALTER GUSTAV NOACK.